(12) United States Patent
Lin et al.

(10) Patent No.: US 9,042,653 B2
(45) Date of Patent: May 26, 2015

(54) ASSOCIATING CAPTURED IMAGE DATA WITH A SPREADSHEET

(75) Inventors: Amy Lin, Redmond, WA (US); Shahar Prish, Redmond, WA (US); Sherman Der, NewCastle, WA (US); John Campbell, Renton, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1001 days.

(21) Appl. No.: 13/012,718

(22) Filed: Jan. 24, 2011

(65) Prior Publication Data

US 2012/0189203 A1   Jul. 26, 2012

(51) Int. Cl.
G06K 9/00 (2006.01)
G06F 17/24 (2006.01)

(52) U.S. Cl.
CPC .................. G06F 17/246 (2013.01)

(58) Field of Classification Search
None
See application file for complete search history.

(56) References Cited

U.S. PATENT DOCUMENTS

| | | | |
|---|---|---|---|
| 6,064,766 A | 5/2000 | Sklarew | |
| 6,766,069 B1 | 7/2004 | Dance et al. | 382/309 |
| 6,816,630 B1* | 11/2004 | Werth et al. | 382/287 |
| 7,882,427 B2* | 2/2011 | Raja et al. | 715/212 |
| 8,718,364 B2* | 5/2014 | Enomoto | 382/173 |
| 2003/0103238 A1 | 6/2003 | MacLean et al. | 358/1.18 |
| 2003/0177448 A1 | 9/2003 | Levine | |
| 2004/0049730 A1* | 3/2004 | Ishizaka | 715/503 |
| 2004/0103365 A1* | 5/2004 | Cox | 715/503 |
| 2007/0277090 A1* | 11/2007 | Raja et al. | 715/503 |
| 2008/0320403 A1* | 12/2008 | Glaberson | 715/763 |
| 2009/0208103 A1 | 8/2009 | Lin | |

FOREIGN PATENT DOCUMENTS

| | | |
|---|---|---|
| CN | 1673995 | 9/2005 |
| CN | 101329731 | 12/2008 |
| JP | 2005149117 A * | 6/2005 |

OTHER PUBLICATIONS

ScanStore.com; ABBYY FineReader 10 Professional Download Only Version—Retrieved Date: Oct. 12, 2010; http://www.scanstore.com/Scanning_Software/OCR/default.asp?ITEM_ID=18288; 5 pgs.

Cvision.com; OCR Scanning Software—Retrieved Date: Oct. 13, 2010; http://www.cvisiontech.com/fileformats/scanned-documents/ocr-scanning-software-25.html?lang=eng; 1 pg.

(Continued)

Primary Examiner — John Strege
(74) Attorney, Agent, or Firm — Damon Rieth; Jim Ross; Micky Minhas (57) ABSTRACT

A spreadsheet application associates data obtained from a captured image with a spreadsheet. For example, one or more images of physical data may be captured and translated into electronic data that is automatically associated with one or more spreadsheets. The formatting and underlying formulas of the data included within the captured image may be represented within a spreadsheet (e.g. highlighted data remains highlighted within the electronic spreadsheet). The data may also be compared with existing electronic data. For example, differences between the data in the captured image with the data in an existing spreadsheet may be used to update the existing spreadsheet. A display of a captured image may be also be augmented using data that is obtained from the captured image. For example, a chart may be created and displayed using data that is obtained from the captured image.

20 Claims, 11 Drawing Sheets

(56) References Cited

OTHER PUBLICATIONS

MacKay, W.; Augmented Reality: Linking real and virtual worlds A new paradigm for interacting with computers—Retrieved Date: Oct. 13, 2010; http://www.lri.fr/~mackay/pdfffiles/AVI98.AgumentedReality.pdf; 9 pgs.

Pearl-Repro.co.uk; Data Capture & Form Scanning—Retrieved Date: Oct. 13, 2010; http://www.pearl-repro.co.uk/services/data-capture.html; 2 pgs.

ABBYY.com; FineReader Optical Character Recognition (OCR) Software from ABBYY Included with Mustek Scanners—Retrieved Date: Oct. 13, 2010; http://www.abbyy.com/Default.aspx?DN=952fd935-5ff2-475d-a7da-8245f5025ce3; 3 pgs.

Sigchi.org; PaperLink: A Technique for Hyperlinking from Real Paper to Electronic Content—Retrieved Date: Oct. 13, 2010; http://www.sigchi.org/chi97/proceedings/paper/seh.htm; 13 pgs.

Cogniview.com; Normal and scanned (Image) PDF file conversion to Microsoft Excel—Retrieved Date: Oct. 13, 2010; http://www.cogniview.com/pdf2xl-ocr.php; 3 pgs.

Macupdate.com; PDF to Spreadsheet Pro 1.3.4—Retrieved Date: Oct. 13, 2010; http://www.macupdate.com/info.php/id/35053/pdf-to-spreadsheet-pro; 3 pgs.

International Search Report mailed Jul. 30, 2012, issued in PCT/US2012/021399.

Office Action dated Nov. 5, 2014, issued in CN Appln. No. 201210020302.6, 2 w/translation.

Office Action dated Mar. 4, 2014, issued in CN Appl. No. 201210020302.6, w/translation.

* cited by examiner

ASSOCIATING CAPTURED IMAGE DATA WITH A SPREADSHEET

BACKGROUND

Many people utilize electronic spreadsheets to interact with data. The data, however, is not always stored electronically. For example, many people still print out spreadsheets, write lists on paper, receive printed receipts and the like. To use this data in a spreadsheet, the user ends up typing in the desired data into the respective cells of the spreadsheet. This can be a time-consuming/error prone process.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A spreadsheet application associates data obtained from a captured image with a spreadsheet. For example, one or more images of data may be captured and translated into electronic data that is automatically associated with one or more spreadsheets. The formatting and underlying formulas of the data included within the captured image may be represented within a spreadsheet (e.g. highlighted data remains highlighted within the electronic spreadsheet). The data may also be compared with existing electronic data. For example, differences between the data in the captured image with the data in an existing spreadsheet may be used to update the existing spreadsheet. A display of a captured image may be also be augmented using data that is obtained from the captured image. For example, a chart may be created and displayed using data that is obtained from the captured image.

DETAILED DESCRIPTION

Referring now to the drawings, in which like numerals represent like elements, various embodiment will be described. In particular, FIG. 1 and the corresponding discussion are intended to provide a brief, general description of a suitable computing environment in which embodiments may be implemented.

Generally, program modules include routines, programs, components, data structures, and other types of structures that perform particular tasks or implement particular abstract data types. Other computer system configurations may also be used, including hand-held devices, multiprocessor systems, microprocessor-based or programmable consumer electronics, minicomputers, mainframe computers, and the like. Distributed computing environments may also be used where tasks are performed by remote processing devices that are linked through a communications network. In a distributed computing environment, program modules may be located in both local and remote memory storage devices.

Figure 1:
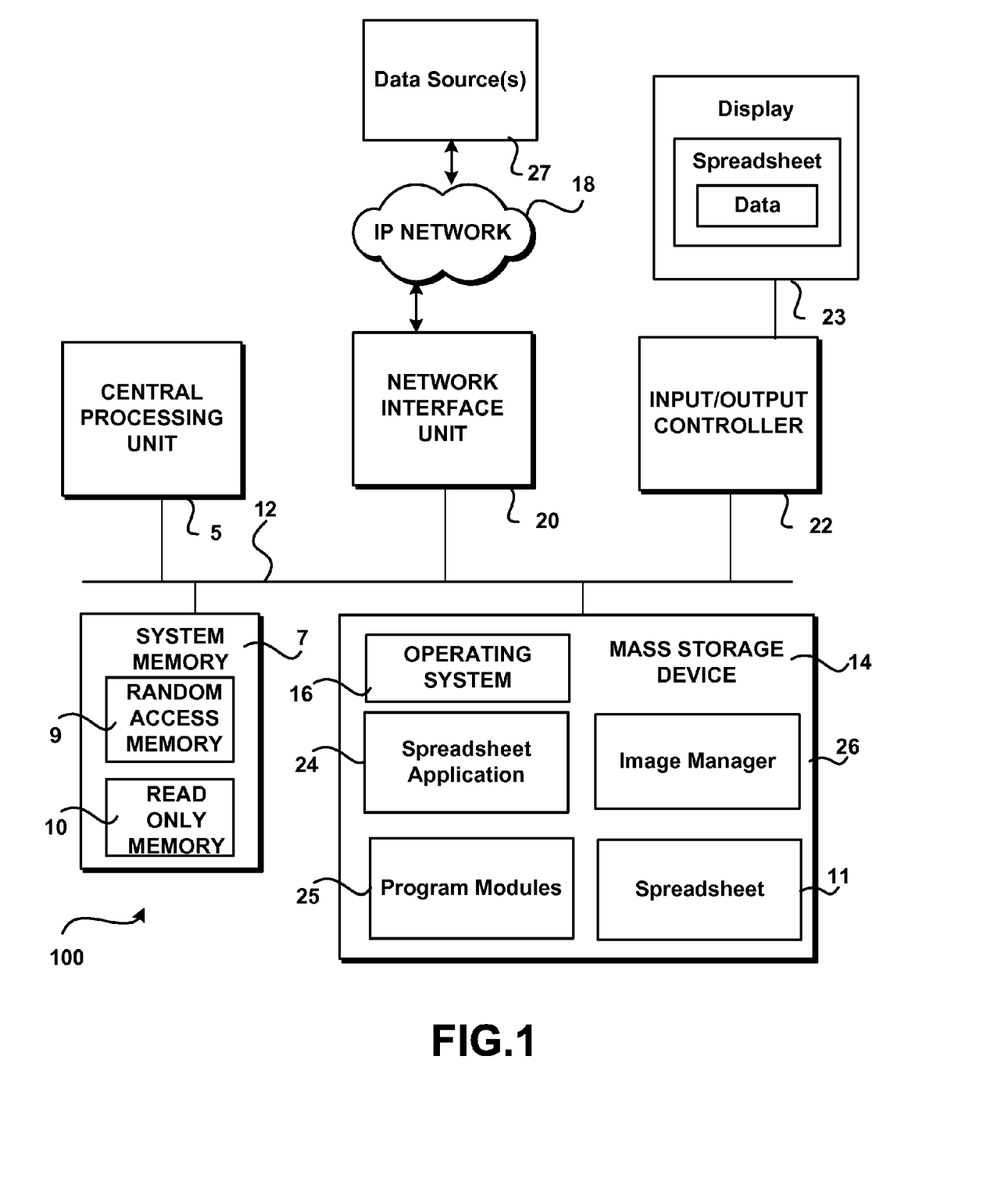
FIG. 1 illustrates an exemplary computing environment.

Referring now to FIG. 1, an illustrative computer environment for a computer 100 utilized in the various embodiments will be described. The computer environment shown in FIG. 1 includes computing devices that each may be configured as a server, a desktop or mobile computer, or some other type of computing device and includes a central processing unit 5 ("CPU"), a system memory 7, including a random access memory 9 ("RAM") and a read-only memory ("ROM") 10, and a system bus 12 that couples the memory to the central processing unit ("CPU") 5.

A basic input/output system containing the basic routines that help to transfer information between elements within the computer, such as during startup, is stored in the ROM 10. The computer 100 further includes a mass storage device 14 for storing an operating system 16, spreadsheet 11, spreadsheet application 24, other program modules 25, and image manager 26 which will be described in greater detail below.

The mass storage device 14 is connected to the CPU 5 through a mass storage controller (not shown) connected to the bus 12. The mass storage device 14 and its associated computer-readable media provide non-volatile storage for the computer 100. Although the description of computer-readable media contained herein refers to a mass storage device, such as a hard disk or CD-ROM drive, the computer-readable media can be any available media that can be accessed by the computer 100.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, Erasable Programmable Read Only Memory ("EPROM"), Electrically Erasable Programmable Read Only Memory ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer 100.

Computer 100 operates in a networked environment using logical connections to remote computers through a network 18, such as the Internet. The computer 100 may connect to the network 18 through a network interface unit 20 connected to the bus 12. The network connection may be wireless and/or wired. The network interface unit 20 may also be utilized to connect to other types of networks and remote computer systems. The computer 100 may also include an input/output controller 22 for receiving and processing input from a number of other devices, including a keyboard, mouse, or electronic stylus (not shown in FIG. 1). Similarly, an input/output controller 22 may provide input/output to a scanner, a camera, a display screen 23, a printer, or other type of input and/or output device.

As mentioned briefly above, a number of program modules and data files may be stored in the mass storage device 14 and RAM 9 of the computer 100, including an operating system 16 suitable for controlling the operation of a computer, such as the WINDOWS 7® operating system from MICROSOFT CORPORATION of Redmond, Wash. The mass storage device 14 and RAM 9 may also store one or more program modules. In particular, the mass storage device 14 and the RAM 9 may store one or more application programs, including a spreadsheet application 24 and program modules 25. According to an embodiment, the spreadsheet application 24 is the MICROSOFT EXCEL spreadsheet application. Other spreadsheet applications may also be used.

Image manager 26 is configured to integrate data that is obtained from a captured image with a spreadsheet. Image manager 26 may be located externally from spreadsheet application 24 as shown or may be a part of spreadsheet application 24. Further, all/some of the functionality provided by image manager 26 may be located internally/externally from spreadsheet application 24.

Spreadsheet application 24 is configured to integrate data that is obtained from one or more captured images. For example, one or more captured images including data may be translated into electronic data that is automatically associated with one or more spreadsheets using image manager 26. The formatting and underlying formulas of the captured data may be represented within an associated spreadsheet (e.g. highlighted data in the captured image remains highlighted within the electronic spreadsheet). The data that is obtained from the captured image may also be compared with and integrated with existing electronic data. For example, differences between the data in the captured image with the data in an existing spreadsheet may be used to update the existing spreadsheet. A display may also be augmented using data from a captured image. For example, a chart may be created and displayed based on data that is contained within a captured image. More details are provided below.

Figure 2:
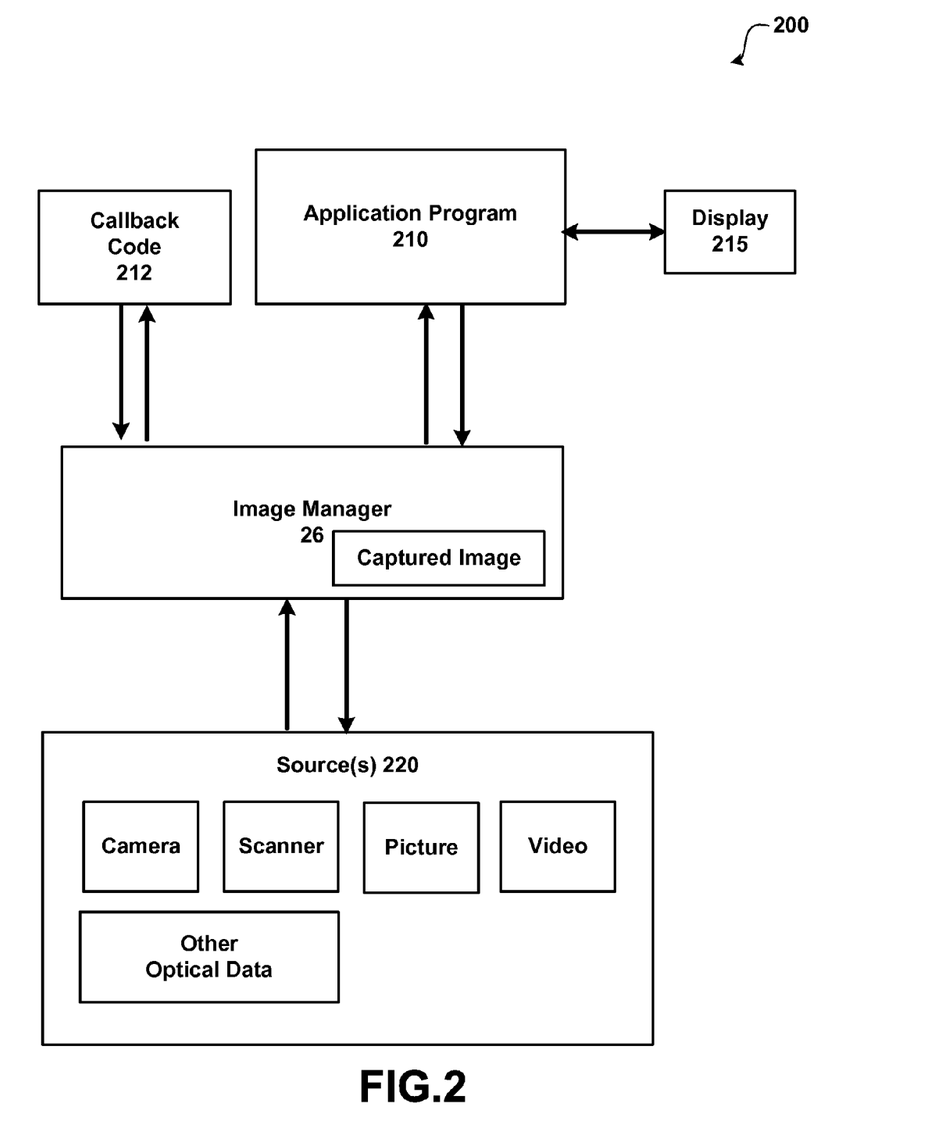
FIG. 2 shows a system for automatically incorporating data from a captured image into a spreadsheet.

FIG. 2 shows a system for automatically incorporating data from a captured image into a spreadsheet. As illustrated, system 200 includes image manager 26, application program 210, callback code 212, source(s) 220 and user 215. The computing device(s) used may be any type of computing device that is configured to perform the operations relating to capturing data and associating the data with a spreadsheet. For example, some of the computing devices may be: mobile computing devices (e.g. cellular phones, tablets, smart phones, laptops, and the like); desktop computing devices and servers.

In order to facilitate communication with the image manager 26, one or more callback routines, illustrated in FIG. 2 as callback code 212 may be implemented. According to one embodiment, application program 24 is a spreadsheet application.

Image manager 26 is configured to receive image data from one or more different sources. For example, source(s) 220 show a camera, a scanner, a picture, a video and other image data that image manager 26 may receive. Generally, image manager 26 may receive any data that may be captured. The source may be static (i.e. a single picture) and/or dynamic (e.g. video feed). According to an embodiment, image manager 26 is configured to capture an image from a dynamic feed.

After an image (e.g. picture, video, live stream) is captured (using a scanner, web cam, camera phone, hand held camera, etc), image manager 26 uses optical character recognition (OCR) technology to detect any optically recognizable data. For example, the captured image may include a table of data that is arranged in columns that are separated by blank space followed by the same pattern on one or more lines. According to an embodiment, the spacing and the lines creates the respective number of columns and rows in the electronic spreadsheet. The captured image may also include a picture that may be incorporated with a spreadsheet. The captured image may also include formatting that may be incorporated with a spreadsheet. For example, characters may be formatted differently from other characters in the captured image. This formatting may be included and displayed in the associated spreadsheet. The captured image may also include a formula that may be incorporated into a spreadsheet. According to an embodiment, any formula is parsed by image manager 26 to create a corresponding spreadsheet formula. A user interface may be shown to a user to assist in converting the formula to a spreadsheet. For example, a variable within the formula may be associated with a spreadsheet element using the user interface.

Display 215 is configured to display a representation of the data that is obtained from the spreadsheet. The data may be included within a display of a spreadsheet and/or used in creating a display of another object. For example, the data obtained from the captured image may be used to create a chart that is displayed, sort a list of values, change a formatting of one or more values and the like.

FIGS. 3-9 show example scenarios that illustrates using captured image data with a spreadsheet.

Figure 3:
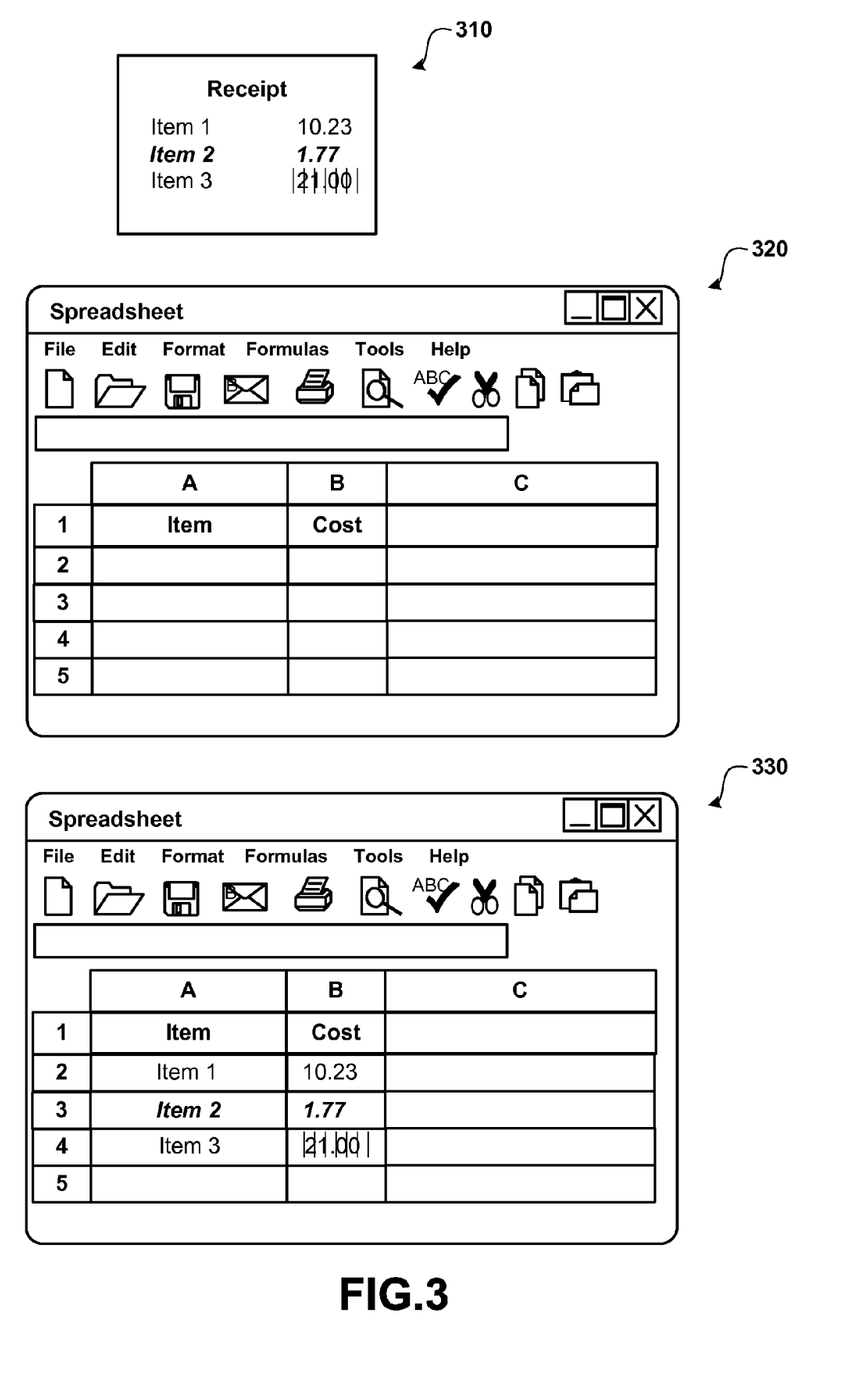
FIG. 3 shows a captured image of a receipt being integrated into a spreadsheet.

FIG. 3 shows a captured image of a receipt being integrated into a spreadsheet. As illustrated, FIG. 3 includes a picture of a receipt 310, a spreadsheet 320 before integrating receipt 310 and spreadsheet 330 after integrating receipt 310.

Receipt 310 may be an electronically printed receipt, a handwritten receipt and/or a combination of handwriting and typed data. For example a user may highlight one or more words on the receipt (e.g. as illustrated 21.00 is highlighted).

Spreadsheet 320 shows an exemplary spreadsheet that includes an item column and a cost column. Spreadsheet 320 may include more or less predefined columns. For example, spreadsheet 320 may be an empty spreadsheet initially. Spreadsheet 320 may be associated with one or more receipts.

Spreadsheet 330 shows the integration of data from receipt 310 into spreadsheet 320. As illustrated, row 2 of spreadsheet 330 includes the data from the first row of receipt 310. Row 3 includes the data from the second row of receipt 310. Row 4 includes the data from the third row of receipt 310. The integration of the data obtained from the captured image of receipt 310 may occur manually/automatically. For example, a user may select a user interface element to begin the integration of the captured data from the receipt. The spreadsheet may also be associated with the capture of receipts such that when a picture of a receipt is captured, the data that is obtained from the captured image is automatically loaded into an associated spreadsheet. For example, receipts from a certain store or type of store may be associated with a particular spreadsheet whereas receipts from another store are associated with another spreadsheet. According to an embodiment, formatting that is included on receipt 310 is displayed in spreadsheet 330. Row 3 of spreadsheet 330 is shown in bold formatting as the corresponding data on receipt 310 is bolded. Cost "21.00" is shown highlighted since it is highlighted on the captured image of receipt 310.

Figure 4:
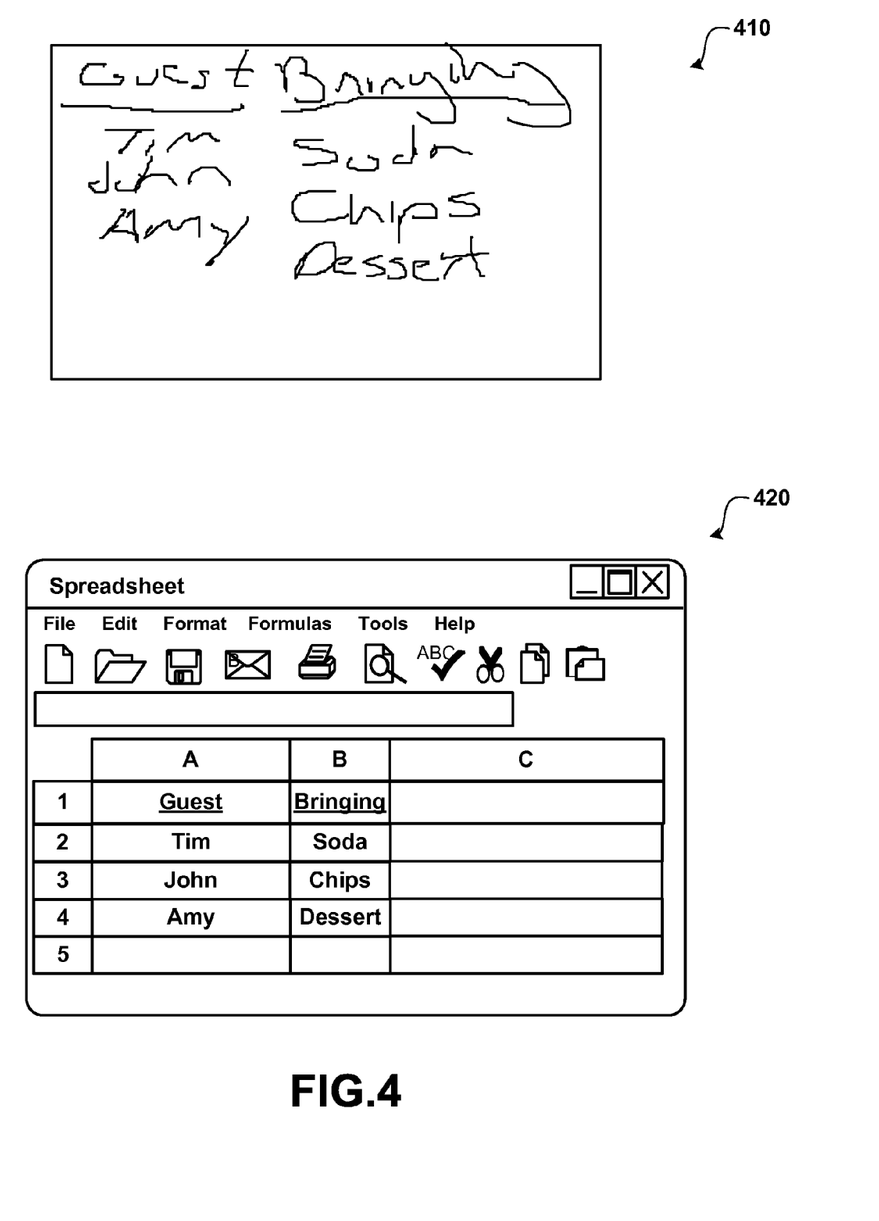
FIG. 4 illustrates a captured image of a handwritten sheet integrated into a spreadsheet.

FIG. 4 illustrates a captured image of a handwritten sheet integrated into a spreadsheet. As illustrated, FIG. 4 includes a captured image of a handwriting 410 and a spreadsheet 420 after integrating the handwriting.

In the current example, a user has captured an image of a handwritten table that includes a guests column and a bringing column. After image 410 is captured, the data that is contained within the captured image is optically recognized and incorporated into spreadsheet 420. As illustrated, the column headings "Guest" and "Bringing" have been associated with spreadsheet 420. The formatting (e.g. underlining) has also been transferred to spreadsheet 420. A user interface element may be used to correct any words that are incorrectly recognized by the image manager. According to an embodiment, each value within the table is placed in a separate cell of spreadsheet 420.

Figure 5:
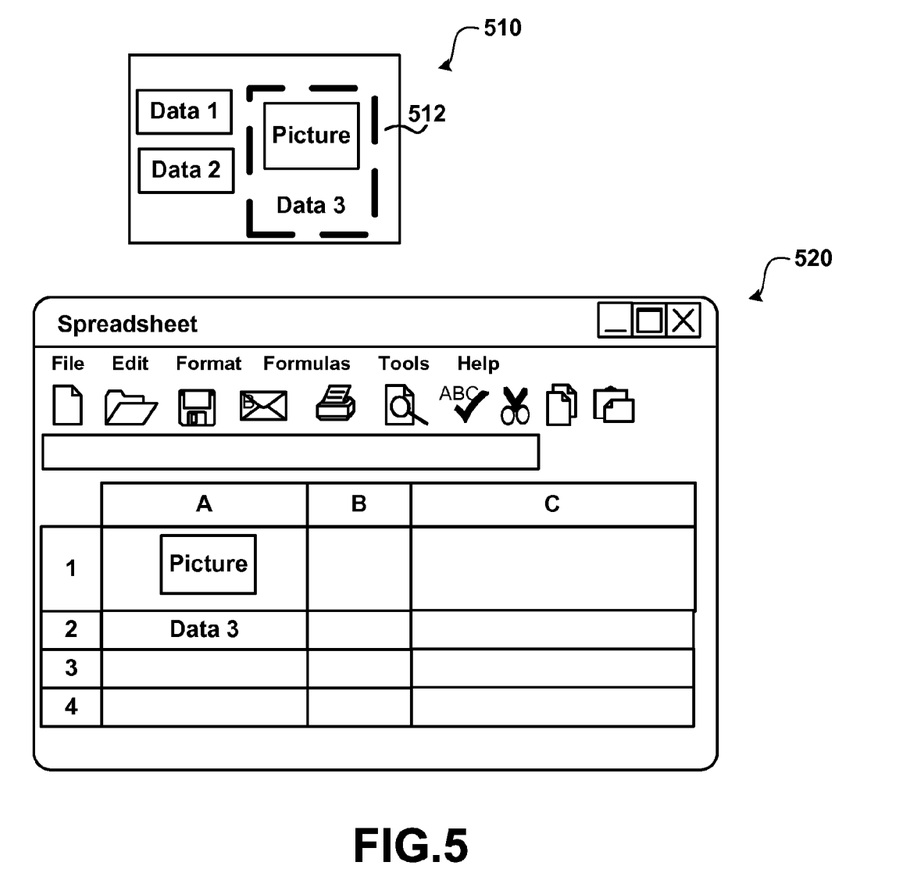
FIG. 5 shows a user selecting a portion of a captured image and integrating the selected portion into a spreadsheet.

FIG. 5 shows a user selecting a portion of a captured image and integrating the selected portion into a spreadsheet.

Captured image 510 includes data 1, data 2, a picture and data 3. Selection box 512 shows that the picture and data 3 are selected for integration into the spreadsheet. In the current example, the picture is placed in cell A1 and data 3 is placed into cell A2. More or fewer cells may be utilized. For example, data 3 may be a list of values that are each placed within a cell of spreadsheet 520.

Figure 6:
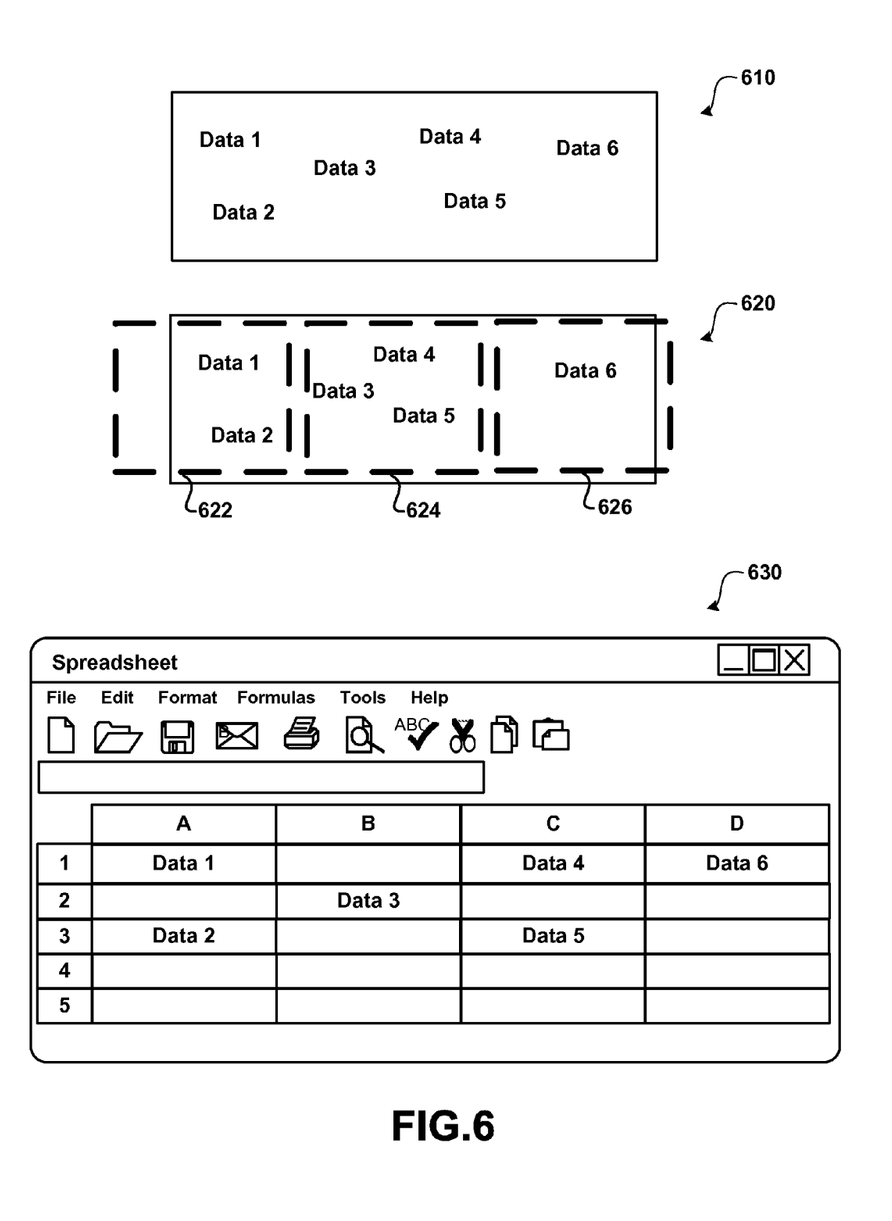
FIG. 6 illustrates a user capturing three different images that are integrated into a spreadsheet.

FIG. 6 illustrates a user capturing three different images that are integrated into a spreadsheet. Sometimes a single image may not be able to capture all of the data so more than one image may be captured and integrated into a spreadsheet. The images may come from a single captured image and/or from a video.

As illustrated three different image (622, 624 and 626) are taken of data 610. The images (622, 624 and 626) are combined and the corresponding data that is contained within each of the captured images is placed within the spreadsheet. Spreadsheet 630 shows that all of the data from each of the three different images is incorporated into the spreadsheet. The data may be placed within the spreadsheet according to its layout in the captured images and/or using some other method. For example, data of a certain type may be placed in one location of the spreadsheet whereas data of another type may be placed in a different location of the spreadsheet.

Figure 7:
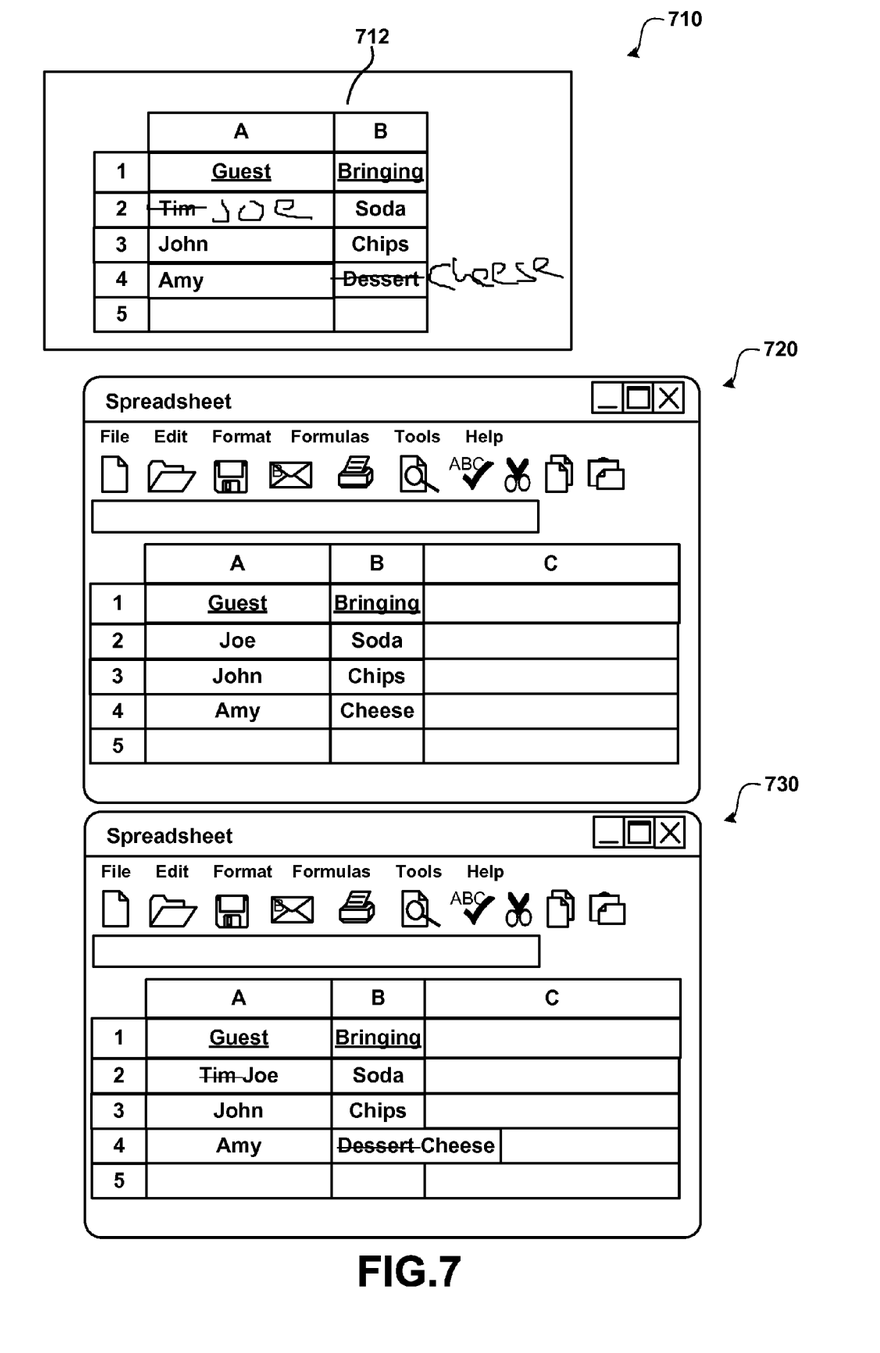
FIG. 7 shows a captured image including a portion of a spreadsheet that includes handwriting.

FIG. 7 shows a captured image including a portion of a spreadsheet that includes handwriting.

In image 710, a user has scratched out the name "Tim" within spreadsheet 712 and has handwritten the name "Joe." A user has also scratched out "Dessert" and has handwritten "Cheese."

A majority of spreadsheet 712 has not changed. According to an embodiment, when data from an existing spreadsheet is matched to a captured image, the differences between the existing spreadsheet and the captured image are determined Any differences may be reflected within the existing electronic spreadsheet. For example, spreadsheet 720 shows spreadsheet 712 that is updated with the handwritten changes. Spreadsheet 720 shows the name Tim replaced with Joe and the Dessert entry replaced with Cheese. A user interface element may be used to confirm/accept the changes before they are made to an existing spreadsheet. According to another embodiment, all of the data is incorporated into the spreadsheet. Spreadsheet 730 shows all of the data incorporated into a spreadsheet.

Figure 8:
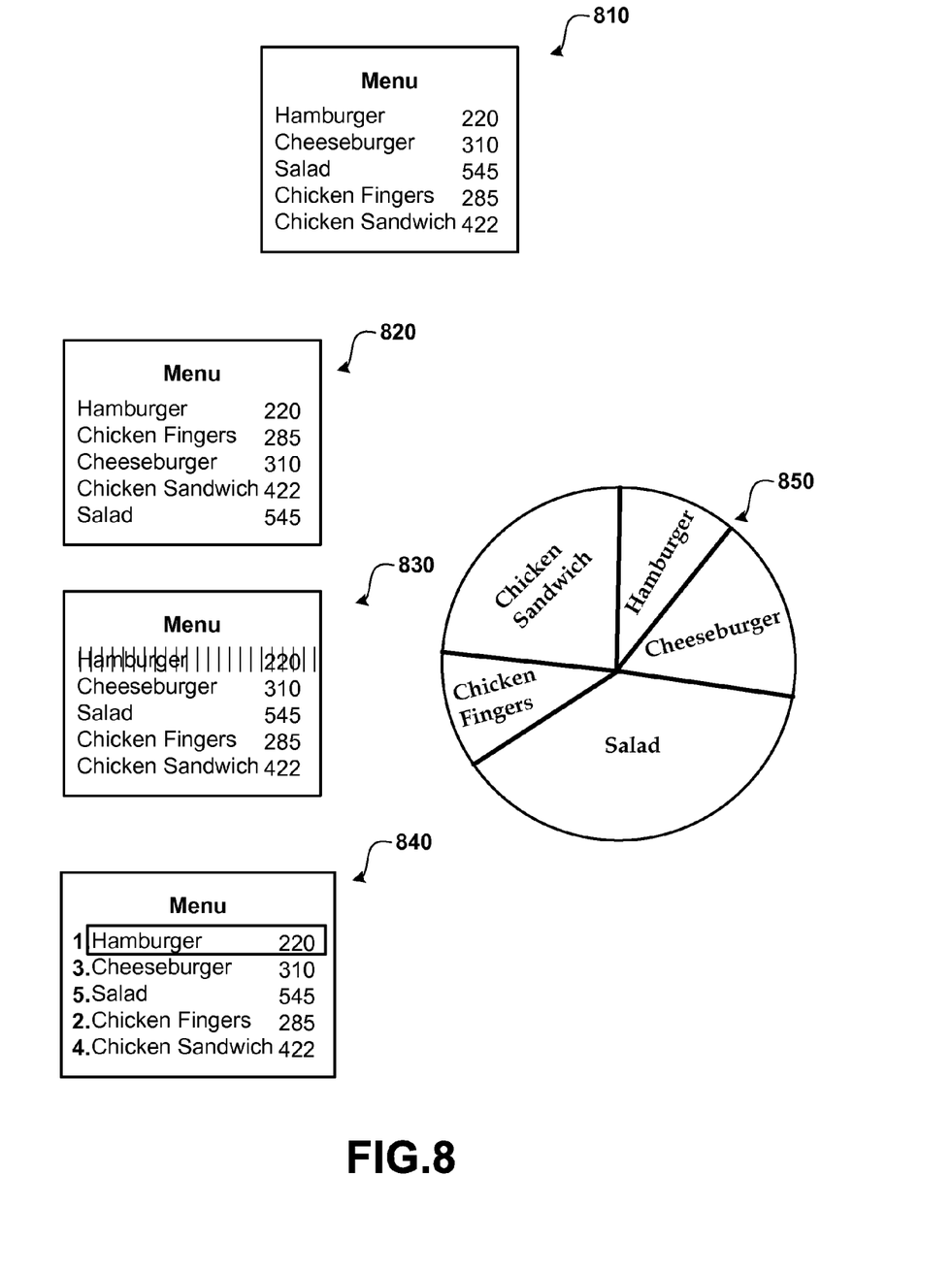
FIG. 8 illustrates augmenting a captured image using data from the captured image.

FIG. 8 illustrates augmenting a captured image using data from the captured image. The captured image may be an image of many different types of physical items, such as a receipt, a menu, a bank statement, a sports score section, and other images that include data on which spreadsheet operations can be performed. As illustrated, image 810 is a menu that includes different food items. As discussed above, data from captured image 810 may be associated with a spreadsheet. According to an embodiment, the spreadsheet is not displayed. Instead, an augmented image using the captured image is displayed to the user. In display 820, the image of the menu is displayed such that the menu items are sorted by calorie count. Display 820 shows the lowest caloric item first and the highest caloric item last. Other sorting/display preferences may also be used. For example, highest to lowest, most nutritional and/or some other condition may be used. The augmented image may be formatted in many different ways. For example, a combination of conditional formatting/highlighting may be applied (e.g. a column could be sorted by one value and have formatting/highlighting applied to the same column/different column based on the same/different value). More than one column of data may be used to create the augmented image.

Display 830 shows the original menu 810 with the lowest caloric item highlighted. In this example, the hamburger entry is shown highlighted. According to an embodiment, the captured image 810 is shown with highlighting added. The highlighting may be any type of formatting that highlights a value (e.g. icon based, picture based, gradients, and the like).

Display 840 shows the original menu 810 with the lowest caloric item surrounded by a box and next to each menu item a number that indicates the order of the caloric content.

Display 850 shows a chart that includes the menu entries. As illustrated, chart 850 is a pie chart. Other charts may also be shown (e.g. bar, line, scatter).

Figure 9:
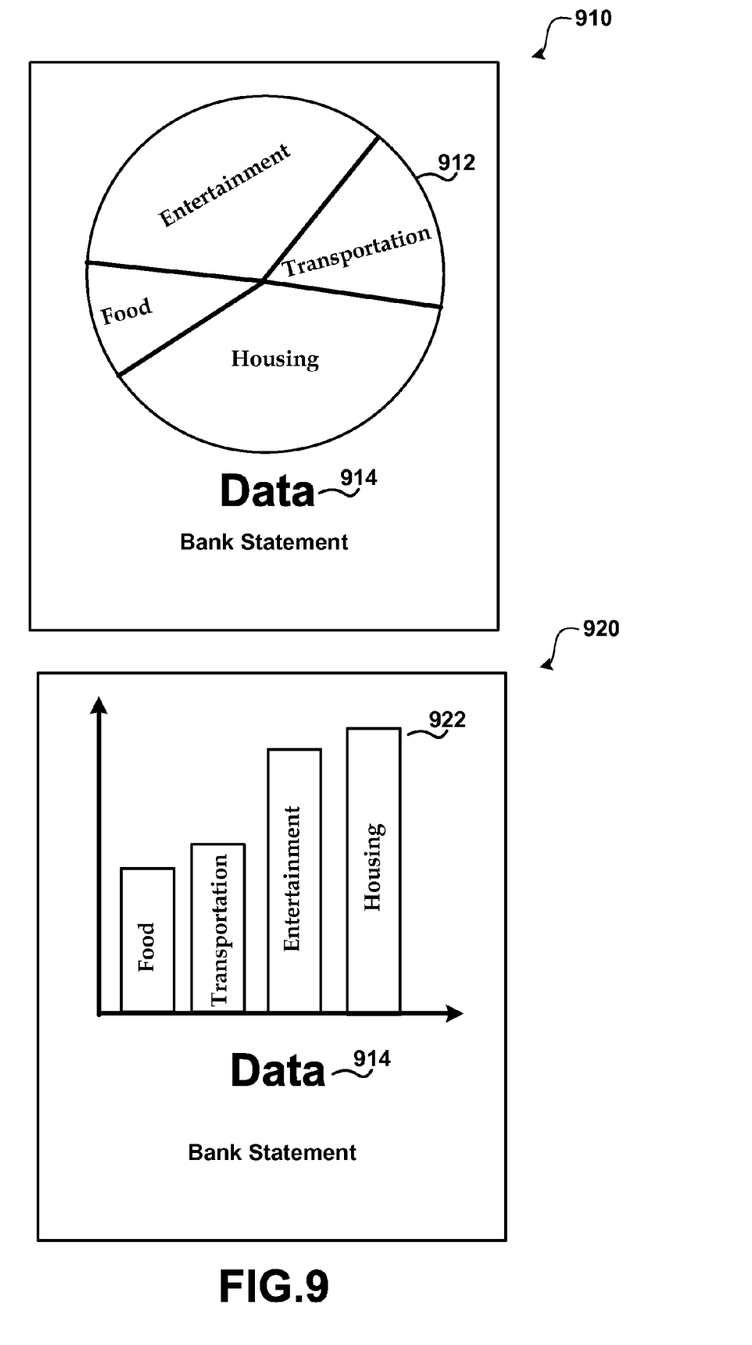
FIG. 9 illustrates another example of capturing an image and augmenting the captured image.

FIG. 9 illustrates another example of capturing an image and augmenting the captured image.

As illustrated, display 910 and display 920 shows a display of a bank statement augmented with a chart that is created from data 914 captured from the image of the bank statement. Chart 912 in display 910 is a pie chart. Chart 922 in display 920 is a bar chart.

One or more images may be taken of the bank statement to obtain the data that is used in creating the chart. The charts are used to assist a user in visualizing the captured data. The created chart may be saved with an associated spreadsheet and/or recreated upon demand from data that is contained within the associated spreadsheet.

Figure 10:
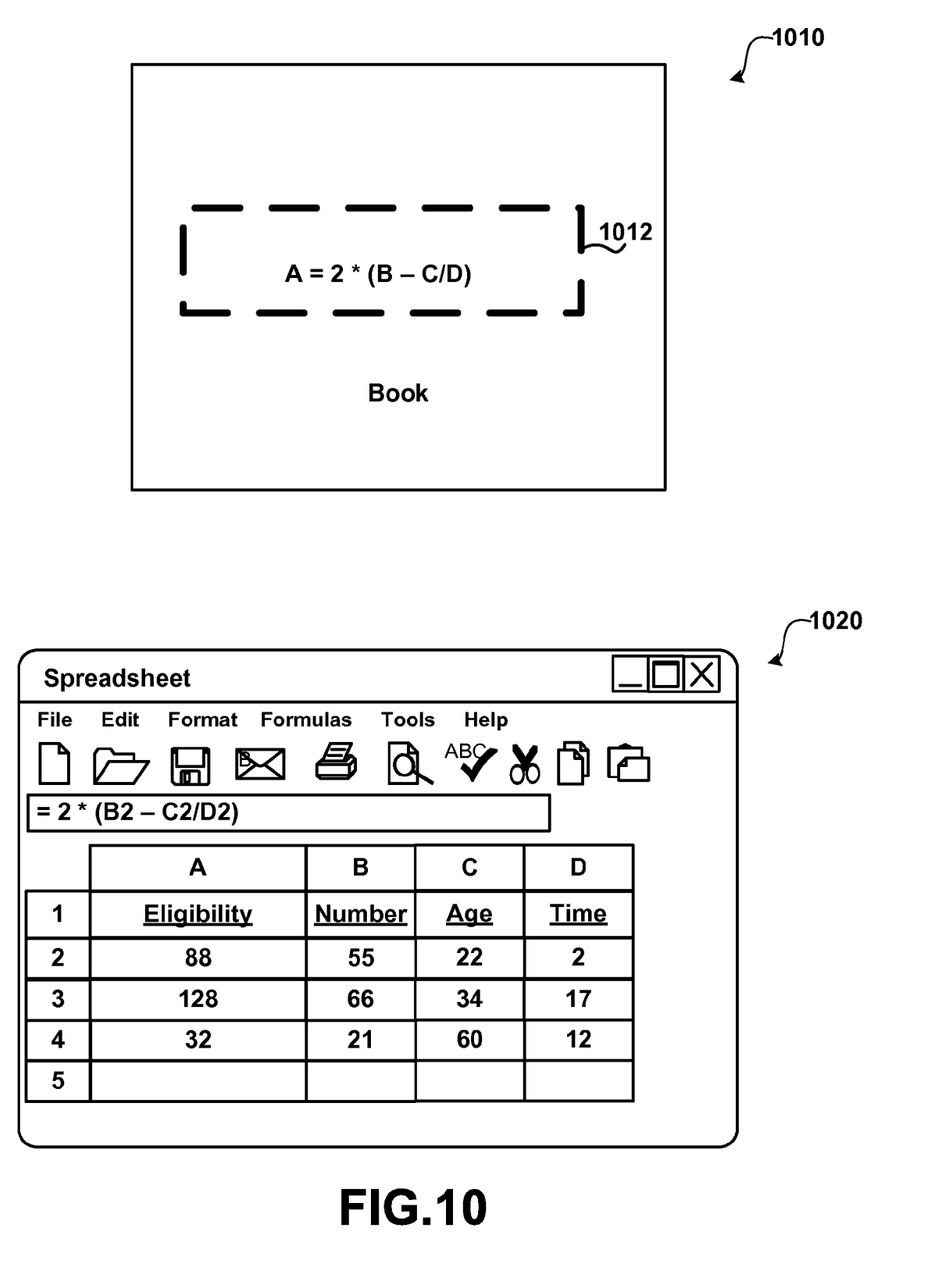
FIG. 10 shows a captured image including a formula that is incorporated into a spreadsheet.

FIG. 10 shows a captured image including a formula that is incorporated into a spreadsheet.

Image 1010 shows a selected formula 1012 that is within the captured image. The formula may be any type of formula that may be represented within a spreadsheet. For purposes of illustration, assume that spreadsheet 1020 included the data in columns A-D of row 1 and the data of columns B-D for rows 2-4. Formula 1012 may be associated with one or more cells (e.g. cells A2, A3 and A4) using a user interface element. After formula 1012 is associated with the cells the spreadsheet may update to show the calculations. As illustrated, cells A2, A3 and A4 have been updated using the values obtained from the corresponding B, C and D columns.

Figure 11:
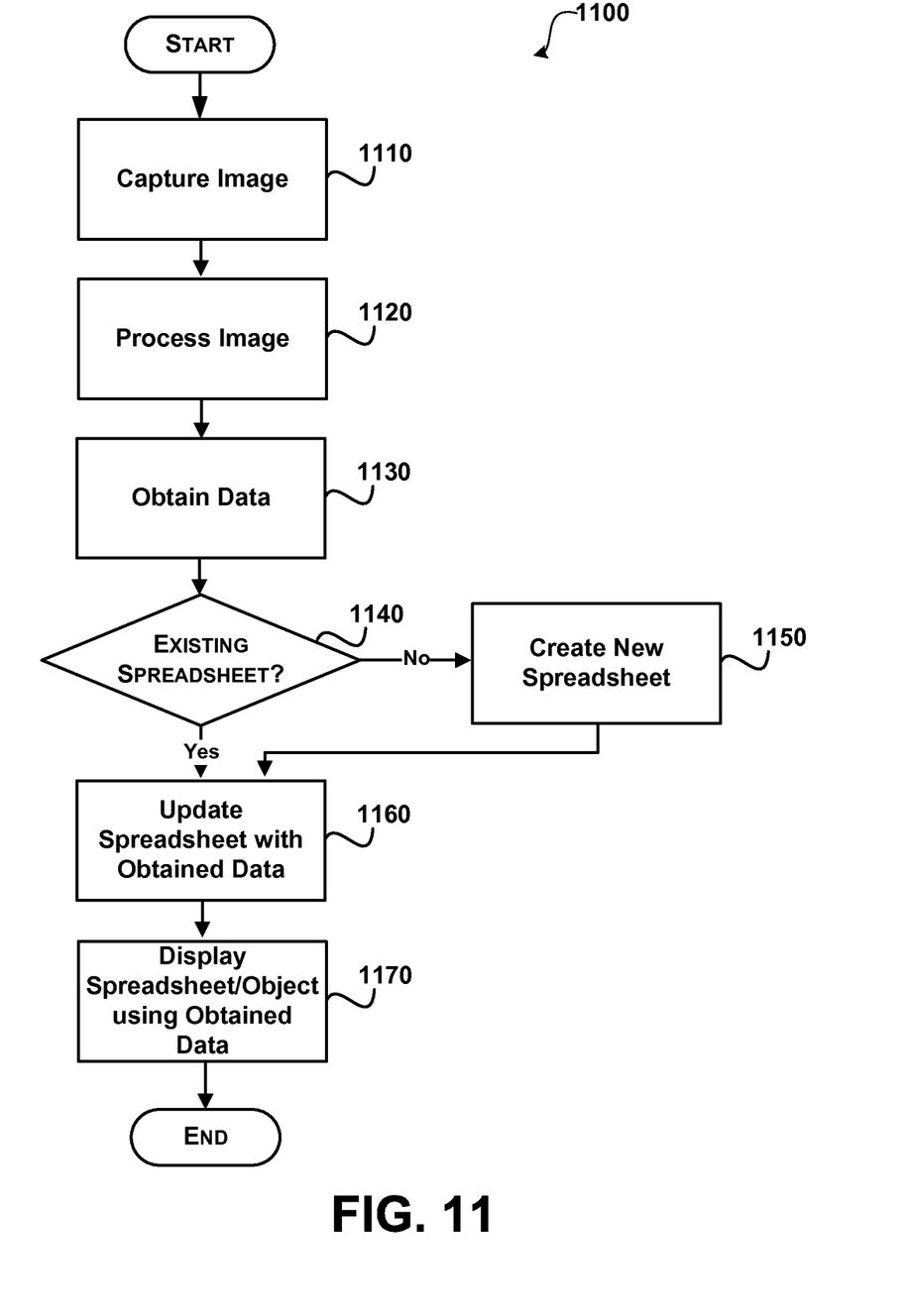
FIG. 11 shows an illustrative process for associating data from a captured image with a spreadsheet.

Referring now to FIG. 11, an illustrative process for associating data from a captured image with a spreadsheet will be described. When reading the discussion of the routines presented herein, it should be appreciated that the logical operations of various embodiments are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations illustrated and making up the embodiments described herein are referred to variously as operations, structural devices, acts or modules. These operations, structural devices, acts and modules may be implemented in software, in firmware, in special purpose digital logic, and any combination thereof.

After a start block, process 1100 moves to operation 1110, where an image is captured. The image may be captured from a static image or a moving image. For example, an image may be captured from a video or captured by taking a picture of a receipt, a piece of paper with text/handwriting or some other object. According to an embodiment, the image includes characters that may be used within a spreadsheet. For example, the image may include a table of numbers and text that describes the numbers. The image may also include handwritten notes/comments and/or printed data.

Moving to operation 1120, the captured image is processed. According to an embodiment, processing the image includes performing an Optical Character Recognition (OCR) operation on the captured image. The OCR operation may be performed by a dedicated application and/or included within the functionality of the image manager and/or spreadsheet application. The OCR operation is configured to recognize when the data in the captured image is in the form of a spreadsheet object, such as a table, list, or some other spreadsheet object. For example, the OCR operation may be configured to determine the spacing between characters and lines within the captured image and use that information to be able to determine an arrangement of a list/table.

Flowing to operation 1130, data is obtained from the captured image. The data may be all/portion of the image. For example, a user may select to only process a portion of the image. The whole image may also be used to obtain data. Additionally, more than one image may be used to obtain data. For example, two or more captured images may be used to capture the data from a single table. In this case each of the captured images may be combined to obtain the data for the entire table.

Transitioning to decision operation 1140, a decision is made as to whether the data relates to an existing spreadsheet. For example, a portion of the data obtained from the captured image may already be stored within an existing spreadsheet. A type of image may also be associated with an existing spreadsheet. For example, a captured image of a bank statement may be associated with an existing statement relating to bank statements, a grocery receipt may be associated with an existing statement that includes grocery items/expenses, and the like. The data may be associated with a spreadsheet manually and/or automatically. For example, a user may select the spreadsheet to associate with all/portion of a captured image using a user interface. Logic may also be used to associate a spreadsheet with data captured from an image. For example, a default banking spreadsheet may be associated with banking data, whereas a default budget spreadsheet may be associated with commonly used budget data. A user may also write logic to associate a spreadsheet with captured data.

When an existing spreadsheet is not associated with the captured image, the process moves to operation 1150 where a new spreadsheet is created.

When an existing spreadsheet is associated with the captured image, the process flows to operation 1160.

At operation 1160, the spreadsheet (either new or existing spreadsheet) is updated with the obtained data. Updating a spreadsheet may include adding/removing cells to the spreadsheet, updating values/formulas/objects within the spreadsheet, and the like. According to an embodiment, a difference operation is performed when the obtained data is related to an existing spreadsheet to determine the cells to update within the spreadsheet.

Flowing to operation 1170, a display is updated that uses the spreadsheet and the obtained data. The display may be a display of the spreadsheet and/or a display of an object using the obtained data. For example, the display may be of a chart that uses data from the captured image to create the chart. The display may be of a differently formatted captured image (e.g. an item is highlighted within the captured image).

The process then flows to an end block and returns to processing other actions.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for using captured image data with a spreadsheet, comprising:
   receiving a captured image; wherein the captured image includes optically recognizable data comprising characters;
   obtaining data from the captured image; wherein at least a portion of the data obtained are characters;
   updating an existing spreadsheet with the data from the captured image when it is determined that the data from the captured image is associated with the existing spreadsheet; wherein updating the existing spreadsheet comprises matching the data from the captured image with data within at least one cell of the existing spreadsheet and, if the data from the captured image and the data within the at least one cell of the existing spreadsheet are different, replacing the data within the at least one cell of the existing spreadsheet with the data from the captured image; and
   associating the data from the captured image with another spreadsheet when it is determined that the data from the captured image is not associated with the existing spreadsheet; wherein associating the data from the captured image comprises placing the data from the captured image within at least one empty cell of the other spreadsheet.

2. The method of claim 1, further comprising maintaining a formatting of the data when it associated with the spreadsheet such that when the data is displayed the formatting included in the captured image is shown.

3. The method of claim 1, wherein obtaining the data from the captured image comprises determining when a formula is obtained within the captured image and integrating the formula into the spreadsheet.

4. The method of claim 1, wherein updating the spreadsheet with the data when it is determined that the data is associated with the existing spreadsheet, comprises determining a difference between the data obtained from the captured image with data in the existing spreadsheet and updating the spreadsheet to reflect the difference.

5. The method of claim 1, further comprising displaying a chart from the data obtained from the captured image.

6. The method of claim 5, wherein displaying the chart comprises displaying the chart with a display of at least a portion of the captured image.

7. The method of claim 1, further comprising automatically determining from the captured image an association with a spreadsheet.

8. The method of claim 1, further comprising placing the data that is obtained from the captured image within the spreadsheet based on a spacing between text of the captured image.

9. The method of claim 1, further comprising receiving a selection of a portion of the captured image and obtaining the data from the selected portion.

10. The method of claim 1, wherein receiving the captured image comprises receiving more than one captured image and obtaining data from each of the more than one captured images.

11. The method of claim 1, wherein the captured image includes handwriting.

12. A computer-readable storage device storing computer-executable instructions for using captured image data with a spreadsheet, comprising:
   receiving a captured image; wherein the captured image includes optically recognizable data comprising characters;
   obtaining data from the captured image; wherein at least a portion of the data obtained are characters;
   maintaining a formatting of the data shown in the captured image such that that when the data is displayed the formatting included in the captured image is shown;
   determining when a formula is obtained within the captured image;
   updating an existing spreadsheet with the formula when it is determined that the formula is associated with the existing spreadsheet; wherein updating the existing spreadsheet comprises adding the formula to cells of the existing spreadsheet; and
   associating the formula with another spreadsheet when it is determined that the formula is not associated with the existing spreadsheet; wherein associating the formula comprises placing the formula within cells of the spreadsheet.

13. The computer-readable storage device of claim 12, wherein updating the spreadsheet comprises determining a difference between the data obtained from the captured image with data in the existing spreadsheet and updating the spreadsheet to reflect the difference.

14. The computer-readable storage device of claim 12, further comprising displaying a chart from the data obtained from the captured image with a display of at least a portion of the captured image.

15. The computer-readable storage device of claim 12, further comprising placing the data that is obtained from the captured image within the spreadsheet based on a spacing between text of the captured image.

16. The computer-readable storage device of claim 12, further comprising receiving a selection of a portion of the captured image and obtaining the data from the selected portion.

17. The computer-readable storage device of claim 12, wherein receiving the captured image comprises receiving a captured image of a receipt.

18. A system for using captured image data with a spreadsheet, comprising:
   a network connection that is configured to connect to a network;
   a processor, memory, and a computer-readable storage medium;
   an operating environment stored on the computer-readable storage medium and executing on the processor;
   a display;
   a spreadsheet application;
   a spreadsheet; wherein the spreadsheet comprises cells; and
   an image manager operating in conjunction with the spreadsheet application that is configured to perform actions comprising:
   receive a captured image; wherein the captured image includes optically recognizable data comprising characters;
   obtain data from the captured image; wherein at least a portion of the data obtained are characters;
   maintain a formatting of the data shown in the captured image such that that when the data is displayed the formatting included in the captured image is shown;
   determine when a formula is obtained within the captured image;
   update a spreadsheet with the formula from the captures image; wherein updating the spreadsheet comprises adding the formula to cells of the spreadsheet; and
   update the display using the data that is obtained from the captured image and that is associated with the spreadsheet.

19. The system of claim 18, wherein updating the display using the data that is obtained from the captured image comprises displaying a chart from the data obtained from the captured image with a display of at least a portion of the captured image.

20. The system of claim 18, further comprising receiving a selection of a portion of the captured image and obtaining the data from the selected portion.

* * * * *